(12) United States Patent
Jeun

(10) Patent No.: US 7,529,568 B2
(45) Date of Patent: May 5, 2009

(54) HINGE GUIDE APPARATUS OF SWING-TYPE PORTABLE TERMINAL

(75) Inventor: Young-Mok Jeun, Seoul (KR)

(73) Assignee: Samsung Electronics Co., Ltd (KR)

( * ) Notice: Subject to any disclaimer, the term of this patent is extended or adjusted under 35 U.S.C. 154(b) by 450 days.

(21) Appl. No.: 11/495,968

(22) Filed: Jul. 28, 2006

(65) Prior Publication Data
US 2007/0026907 A1 Feb. 1, 2007

(30) Foreign Application Priority Data
Jul. 28, 2005 (KR) .................. 10-2005-0068964

(51) Int. Cl.
*H04M 1/00* (2006.01)
(52) U.S. Cl. ............... 455/575.1; 455/575.4; 455/90.3; 379/433.11; 379/433.13
(58) Field of Classification Search ............. 455/575.1, 455/575.4, 90.3; 379/433.01, 433.11, 433.13
See application file for complete search history.

(56) References Cited

U.S. PATENT DOCUMENTS 7,184,805 B2 * 2/2007 Cho et al. ............... 455/575.4
7,448,783 B2 * 11/2008 Ohkawa .................... 362/555
2005/0137000 A1 * 6/2005 Toh et al. ................. 455/575.4

FOREIGN PATENT DOCUMENTS
KR 1020050097455 10/2005

* cited by examiner

*Primary Examiner*—Duc M Nguyen
(74) *Attorney, Agent, or Firm*—The Farrell Law Firm, PC

(57) ABSTRACT

A hinge guide apparatus of a swing-type portable terminal which can prevent deflection of a hinge module when the battery pack of the portable terminal is attached or detached is provided. The swing-type portable terminal having a body housing to and from which a battery pack is attached and detached, a swing housing rotating about a hinge axis vertically extending in a front surface of the body housing, and a hinge module having first and second hinge cams, a hinge shaft, and a swing plate to rotatably connecting the swing housing to the body housing. The hinge guide apparatus of the swing-type portable terminal includes at least one engagement guide portion formed in the second hinge cam; and a hinge guide member provided between the first and second hinge cams and movably engaged with the engagement guide portion, the hinge guide member widening the first and second hinge cams without inclination, by moving along the engagement guide portion in the mounting direction of the battery pack in an inclined manner when the battery pack is mounted to the body housing and moving the first hinge cam upward in the direction of the hinge axis.

8 Claims, 13 Drawing Sheets

HINGE GUIDE APPARATUS OF SWING-TYPE PORTABLE TERMINAL

PRIORITY

This application claims priority to an application entitled "HINGE GUIDE APPARATUS OF SWING-TYPE PORTABLE TERMINAL" filed with the Korean Intellectual Property Office on Jul. 28, 2005 and assigned Serial No. 2005-68964, the contents of which are incorporated herein by reference.

BACKGROUND OF THE INVENTION

1. Field of the Invention

The present invention relates to a hinge guide apparatus of a swing-type portable terminal, and more particularly to a hinge guide apparatus of a swing-type portable terminal which can prevent deflection of a hinge module when the battery pack of the portable terminal is attached or detached.

2. Description of the Related Art

In general, the term "portable terminal" refers to a device that connects a user and a service provider, or a user and another user, through a base station, in order to provide communication functions. The portable terminal may be classified into a bar-type portable terminal, a flip-type portable terminal, a folder-type portable terminal, etc., according to its appearance.

The bar-type portable terminal has a structure in which a data input/output means, a transmitter, and a receiver are mounted to one body housing. Therefore, since a keypad, which is the data input means of the portable terminal, is always exposed to the outside, the portable terminal can malfunction. Further, there is a limit in miniaturizing the portable terminal because of the difficulty in securing the distance between the transmitter and the receiver.

The flip-type portable terminal includes a body, a flip, and a hinge module connecting the flip to the body. In the flip-type portable terminal, since a data input/output means, a transmitter, and a receiver are disposed on the body and the flip covers a keypad which is the data input means of the portable terminal, the portable terminal can be prevented from malfunctioning. However, there is also a limit in miniaturizing the portable terminal because of the difficulty in securing the distance between the transmitter and the receiver.

The folder-type portable terminal includes a body, a folder, a hinge module rotatably connecting the folder to the body, and is opened or closed when the folder is rotated in a direction in which the folder is rotated closer to or further away from the body. In the state in which the folder is closed against to the body, the portable terminal is in a call waiting mode and thus malfunction of the keypad can be prevented. Further, since the folder is opened in the talking mode, the portable terminal can sufficiently secure the distance between the transmitter and the receiver, thereby enabling miniaturization of the portable terminal. For that reason, the folder type portable terminal has gradually become the major type of portable terminals.

Recently, as tastes of users selecting portable terminals have become gradually diversified and desires of the users regarding information have rapidly increased, research and development of portable terminals has not satisfied the trend sufficiently. On the other hand, through research and development of portable terminals, a swing-type portable terminal in which a pair of housings are rotatably engaged with each other, with the housings facing each other, has appeared.

Portable terminals having various functions for satisfying desires of consumers, in addition to the original talking function, have been developed. For example, portable terminals now incorporate complex concepts like a on-demand video watching function, a screen talking function, a digital camera function, an Internet function, a TV watching function, etc., as well as the original voice talking function.

The portable terminal having a TV watching function refers to a DMB (Digital Multimedia Broadcasting) terminal through which a user can watch TV programs by using a display unit.

On the other hand, when a user watches TV using a complex mobile communication terminal, a high capacity battery pack is necessary instead of a standard capacity battery pack, in order to increase the watching time.

As shown in FIGS. 1 to 3, the swing-type portable terminal 1 includes a body housing 2 to and from which the battery pack is attached and detached, a swing housing 4 which rotates about a hinge axis A1 extending vertically on the front surface of the body housing 2, with the swing housing 4 facing the body housing 2, and a hinge module 5 which rotatably engages the swing housing 4 with the body housing 2, with the swing housing 4 facing the body housing 2.

As shown in FIG. 1, the hinge module 5 of the swing-type portable terminal restricted by the body housing 2, comprises cam bosses 6a formed on one surface of the first hinge cam 6 with a same angular interval, a hinge shaft 7 located in the swing housing 4 and restricted by the first hinge cam 6, in which cam holes 7a corresponding to the cam bosses 6a are formed at one end thereof, and a second hinge cam 8 restricted by the swing housing 4, which is moved linearly and reciprocally in the direction of the hinge shaft A1 between the first hinge cam 6 and the hinge shaft 7 and is rotated with respect to the hinge axis A1, with the second hinge cam 8 facing the first hinge cam 6.

A swing plate 9, which is rotated together with the second hinge cam 8 and linearly and reciprocally moves the hinge cam 8, is provided between the hinge shaft 7 and the second hinge cam 8. Coil springs 10 for providing a resilient force so that the second hinge cam 8 is applied to the first hinge cam 6 are provided in the swing plate 9.

According to the hinge module of the swing-type portable terminal, as the swing housing is rotated from the body housing, the second hinge cam is linearly and reciprocally moved in the direction of the hinge shaft.

However, as shown in FIGS. 4 and 5, according to the conventional hinge module of the swing-type portable terminal, since a high capacity battery pack attached and detached to and from the body housing is thick, each hinge cam of the hinge module is deflected or is inclined to one side and thus the hinge cams cross each other, thereby generating deformation and damage to each cam.

SUMMARY OF THE INVENTION

Accordingly, the present invention has been made to solve the above-mentioned problems occurring in the prior art, and an object of the present invention is to provide a hinge guide apparatus of a swing-type portable terminal which can prevent deflection of a hinge module of the portable terminal, by employing the hinge guide member in an inclined manner to move the hinge module, when a battery pack is attached and detached.

It is another object of the present invention to provide a hinge guide apparatus of a swing-type portable terminal which can prevent deflection and damage to a hinge module of the portable terminal, by employing the hinge guide to widen the hinge module without inclination when a high capacity battery pack is attached and detached.

In order to accomplish these objects, there is provided a hinge guide apparatus of a swing-type portable terminal which includes a body housing to and from which a battery pack is attached and detached, a swing housing rotating about a hinge axis vertically extending in a front surface of the body housing, and a hinge module having first and second hinge cams, a hinge shaft, and a swing plate to rotatably connect the swing housing to the body housing, the hinge guide apparatus including at least one engagement guide portion formed in the second hinge cam; and a hinge guide member provided between the first and second hinge cams and movably engaged with the engagement guide portion, the hinge guide member widening the first and second hinge cams without inclination, by moving along the engagement guide portion in the mounting direction of the battery pack in an inclined manner when the battery pack is mounted to the body housing and moving upward the first hinge cam in the direction of the hinge axis.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
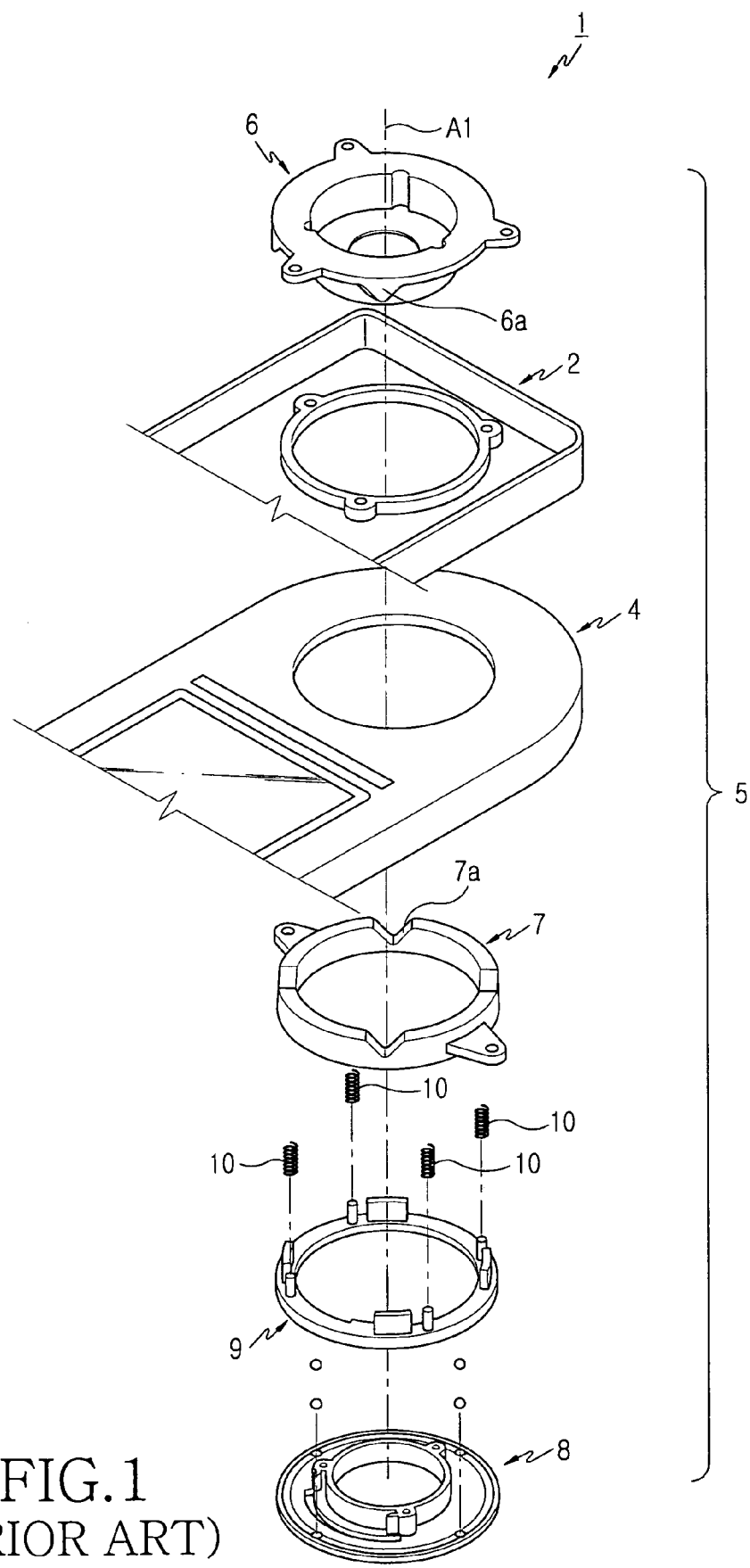
FIG. 1 is an exploded perspective view showing a hinge apparatus of a conventional swing-type portable terminal.
Figure 2:
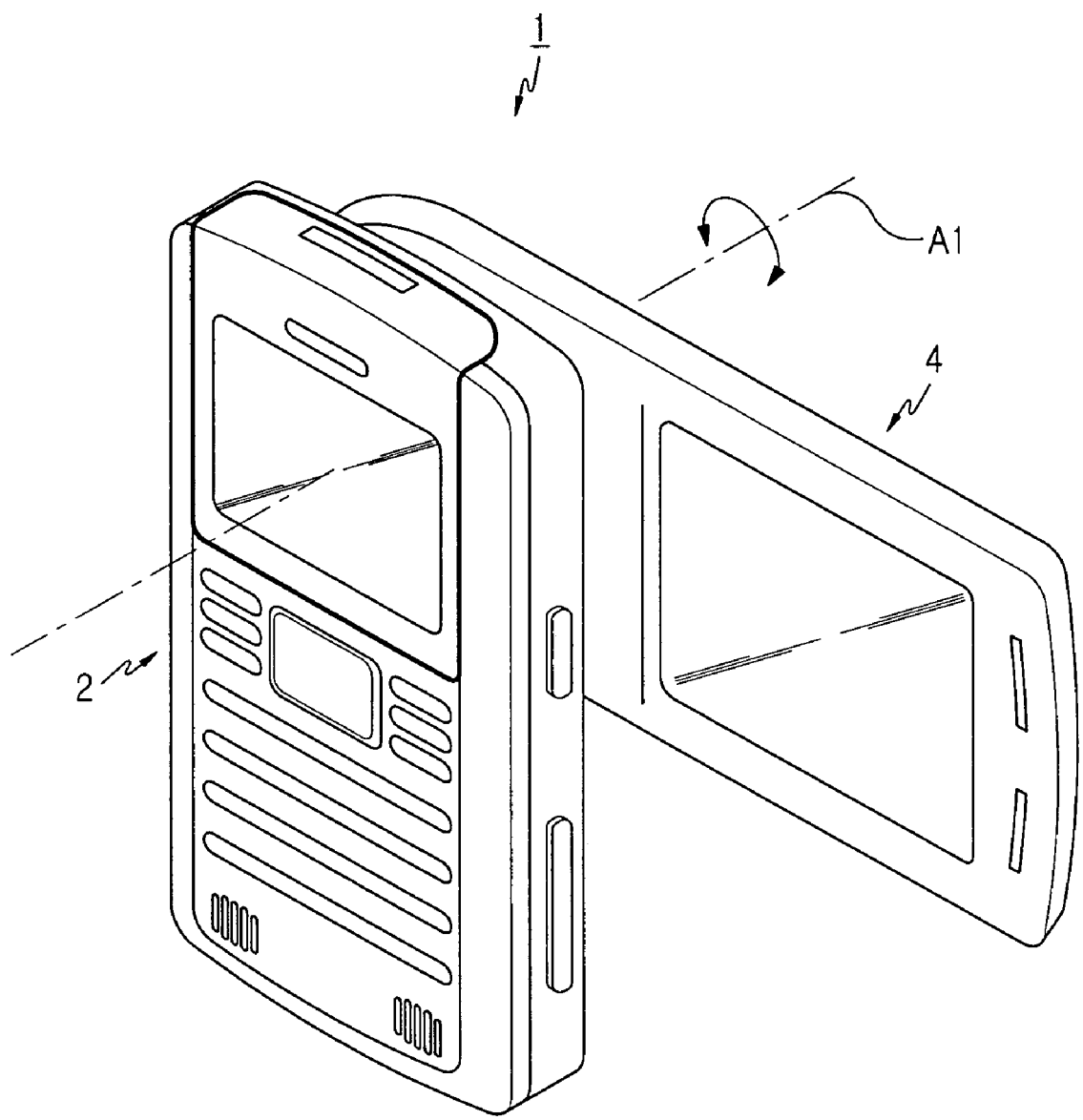
FIG. 2 is a perspective view showing the conventional swing-type portable terminal in which a swing housing is rotated from a body housing.
Figure 3:
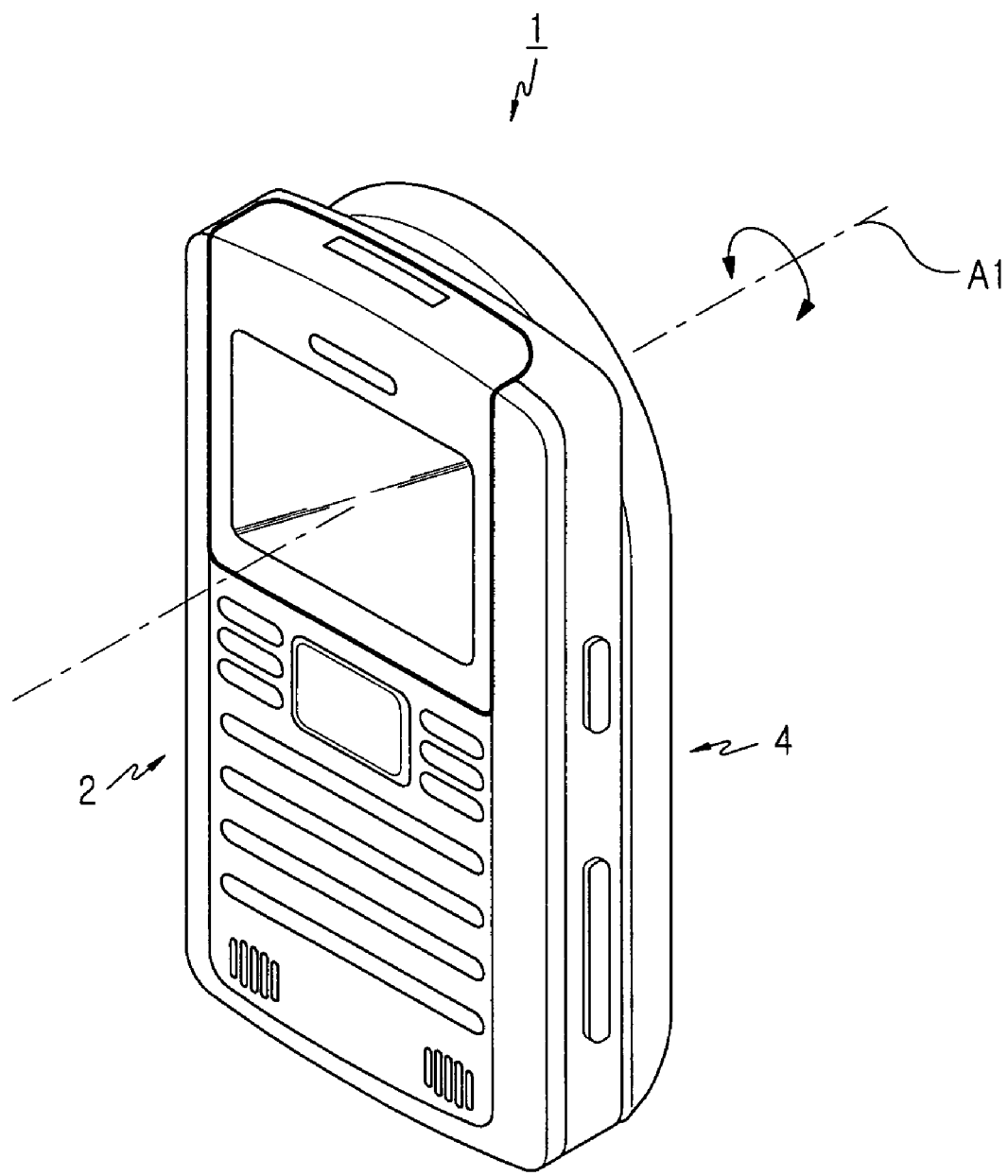
FIG. 3 is a perspective view showing a swing housing of the conventional swing-type portable terminal before the rotation thereof.
Figure 4:
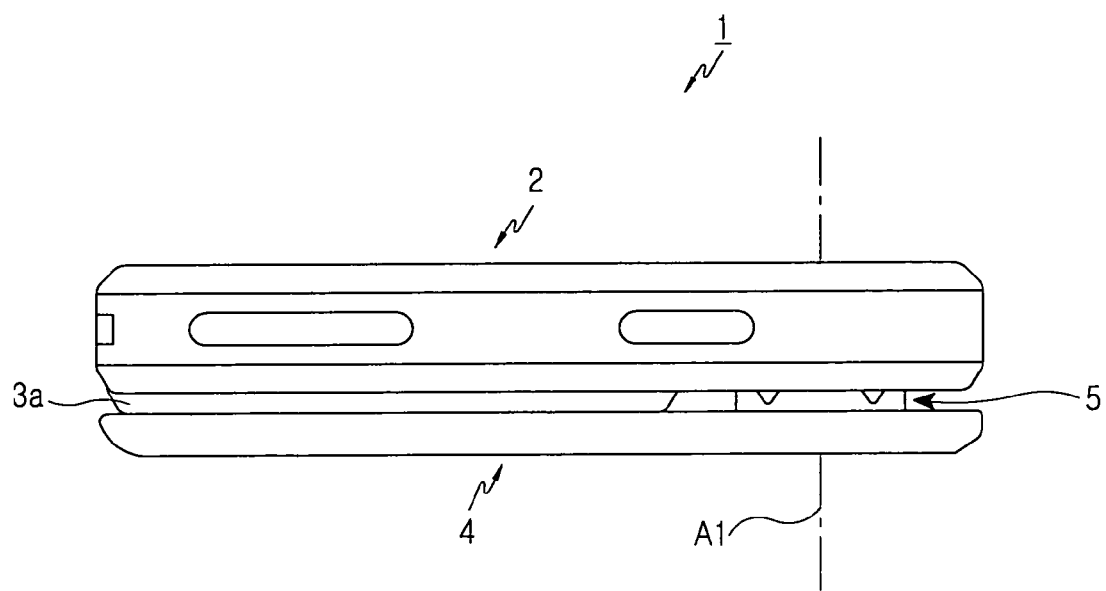
FIG. 4 is a side view showing the conventional swing-type portable terminal to which a standard capacity battery pack is mounted.
Figure 5:
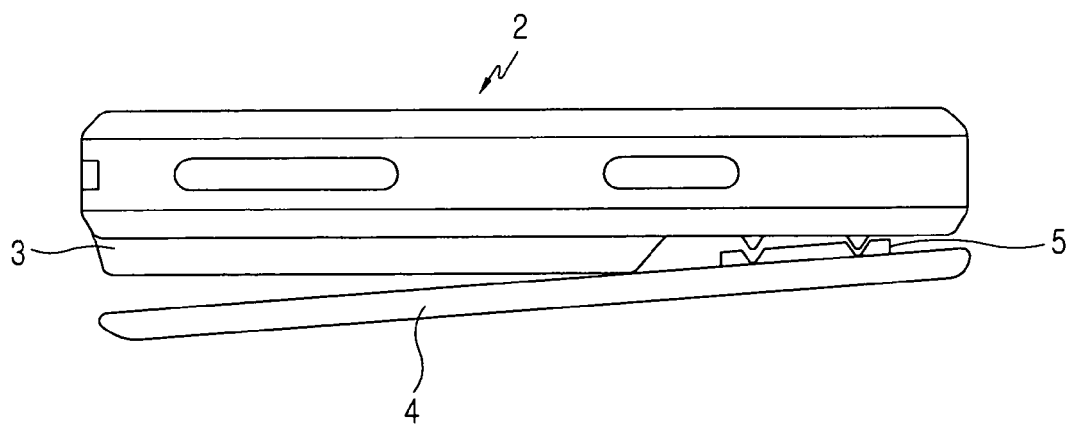
FIG. 5 is a side view showing the conventional swing-type portable terminal to which a high capacity battery pack is mounted.

Hereinafter, a preferred embodiment of the present invention will be described with reference to the accompanying drawings. In the following description of the present invention, a detailed description of known functions and configurations incorporated herein is omitted to avoid making the subject matter of the present invention unclear. In the drawings, the same reference numerals are endowed to the same elements as in the prior art.

As shown in FIGS. 1-4, a swing-type portable terminal includes a body housing 2 to and from which a battery pack 3 is attached and detached, a swing housing 4 rotated, facing the body housing 2, and a hinge module 5 including first and second hinge cams 6 and 7, a hinge shaft 8, and a swing plate 9.

Figure 6:
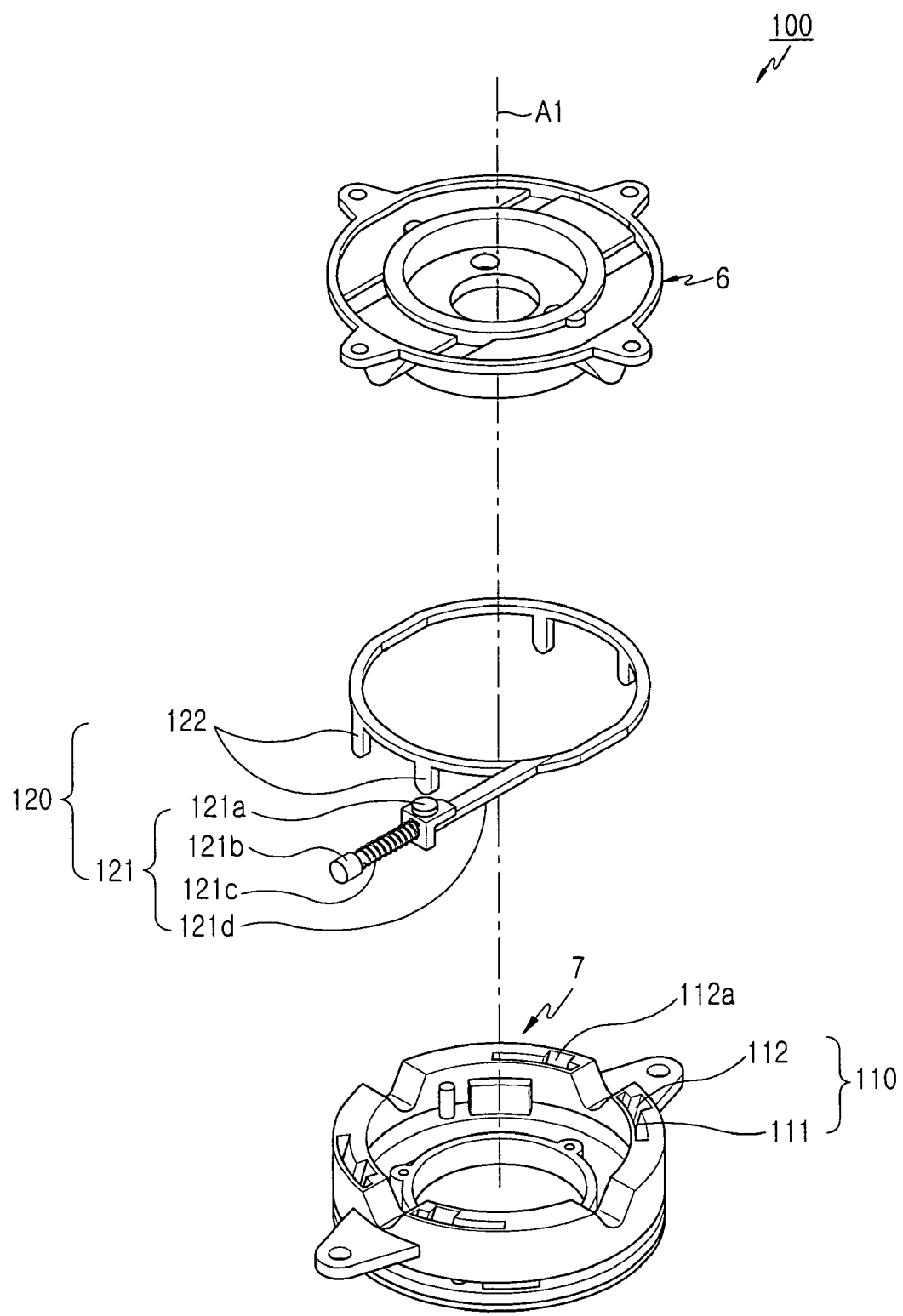
FIG. 6 is an exploded view showing a hinge guide apparatus of a swing type portable terminal according to a preferred embodiment of the present invention.
Figure 7:
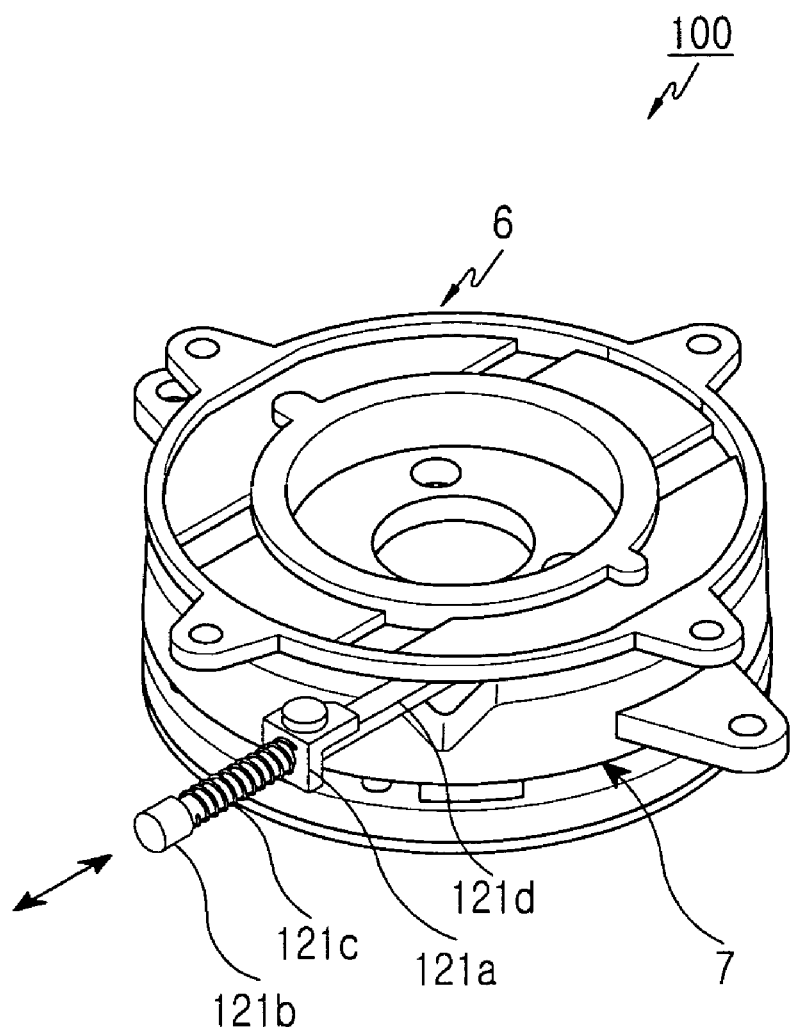
FIG. 7 is a perspective view showing an engaged state of the hinge guide apparatus of the swing type portable terminal according to the preferred embodiment of the present invention.
Figure 16:
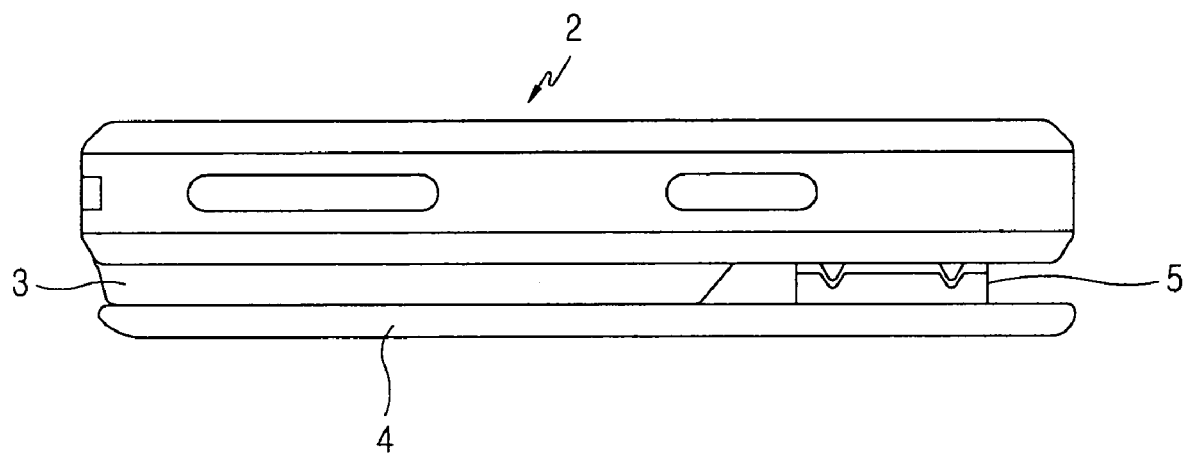
FIG. 16 is a side view showing the state in which a high capacity battery pack is mounted to the swing-type portable terminal according to the preferred embodiment of the present invention.

As shown in FIGS. 6, 7, and 16, a hinge guide apparatus 100 of the swing-type portable terminal includes at least one engagement guide 110 and a hinge guide member 120. The engagement guide 110 is formed on one side surface of a second hinge cam 7 in order to mount the guide member 120 so that the guide member 120 is guided as a battery pack 3 is attached or detached. The hinge guide member 120 is movably engaged with the engagement guide 110. The hinge guide member 120 is provided between the first and second hinge cams 6 and 7, so that the hinge guide member 120 is moved in the direction in which the high capacity battery pack 3 having an increased thickness is mounted to the body housing 2 so as to move along the engagement guide 110, with the hinge guide member 120 being inclined, and the first hinge cam 6 is moved upward in the direction of the hinge shaft A1, thereby widening the first and second hinge cams 6 and 7 without inclination.

Figure 8:
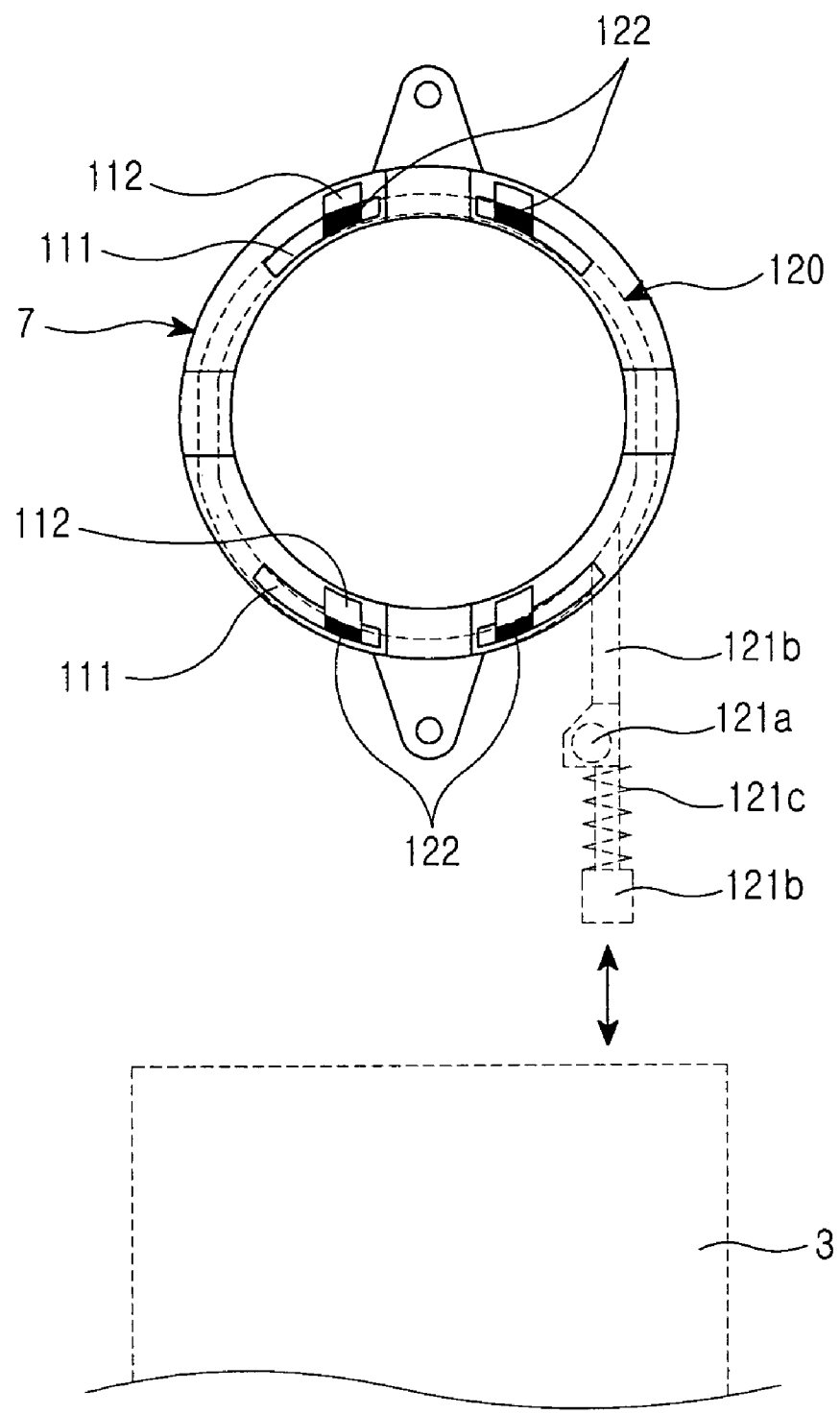
FIG. 8 is a plan view showing the hinge guide apparatus of the swing type portable terminal according to the preferred embodiment of the present invention, before operation thereof.
Figure 9:
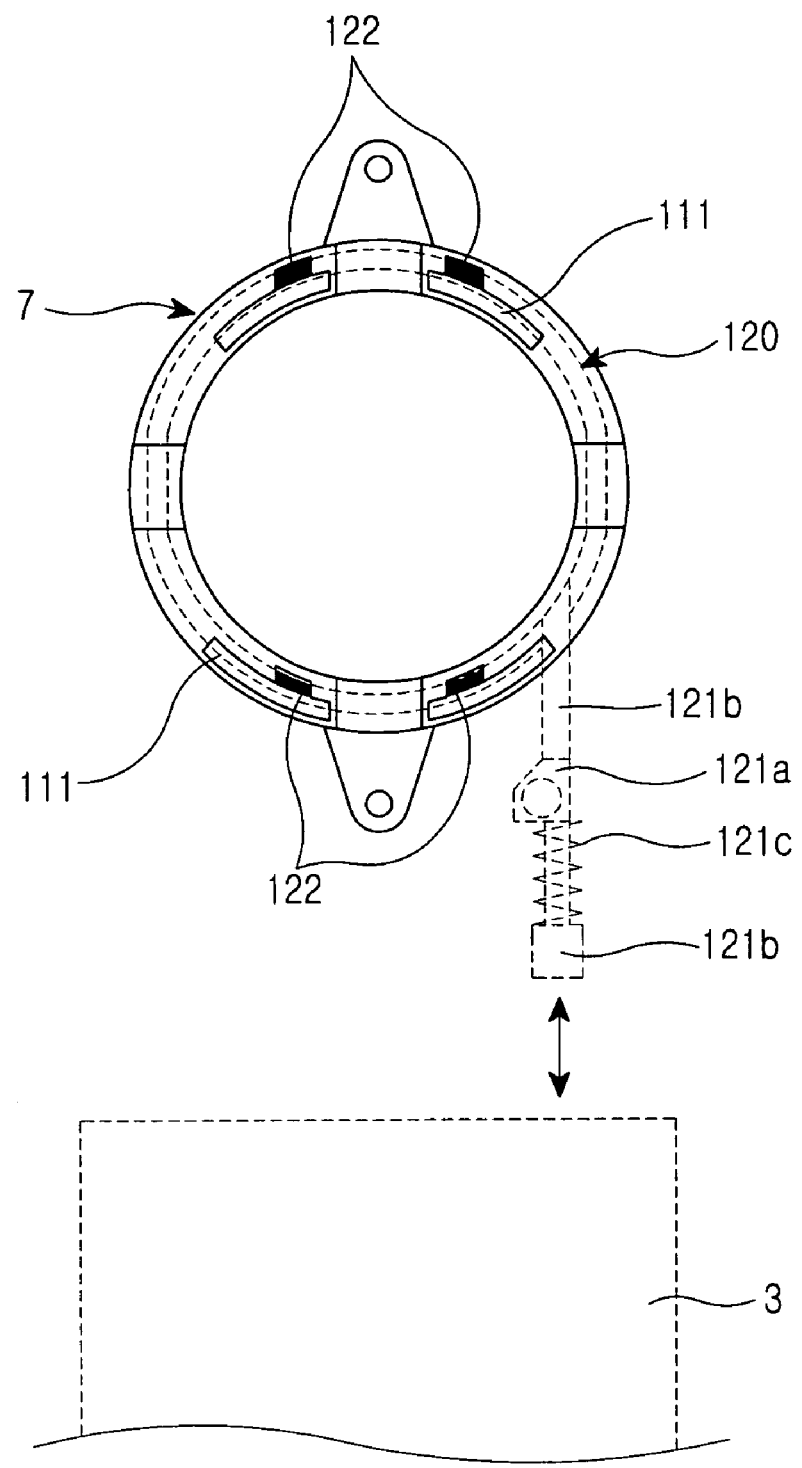
FIG. 9 is a plan view showing the hinge guide apparatus of the swing type portable terminal according to the preferred embodiment of the present invention, after operation thereof.

As shown in FIGS. 8 and 9, each engagement guide portion 110 includes first and second engagement guide portions 111 and 112. The first engagement guide portion 111 engages the hinge guide member 120 with the first hinge cam 6 and is formed along the circumference of the second hinge cam 7 so as to be engaged with a protruding engagement member 122 of the hinge guide member 120. The second engagement guide portion 112 is formed at a location adjacent to the first engagement guide portion 111 so as to guide the movement of the hinge guide member 120 and to move upward the hinge guide member 120 in the direction of the hinge axis A1, with the hinge guide member inclined.

Figure 11:
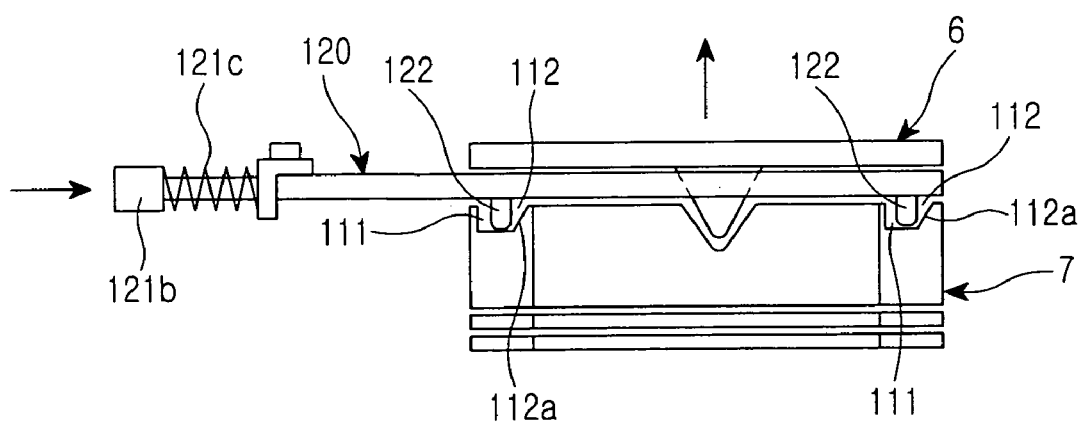
FIG. 11 is a side sectional view showing the hinge guide apparatus of the swing type portable terminal according to the preferred embodiment of the present invention, before operation thereof.
Figure 13:
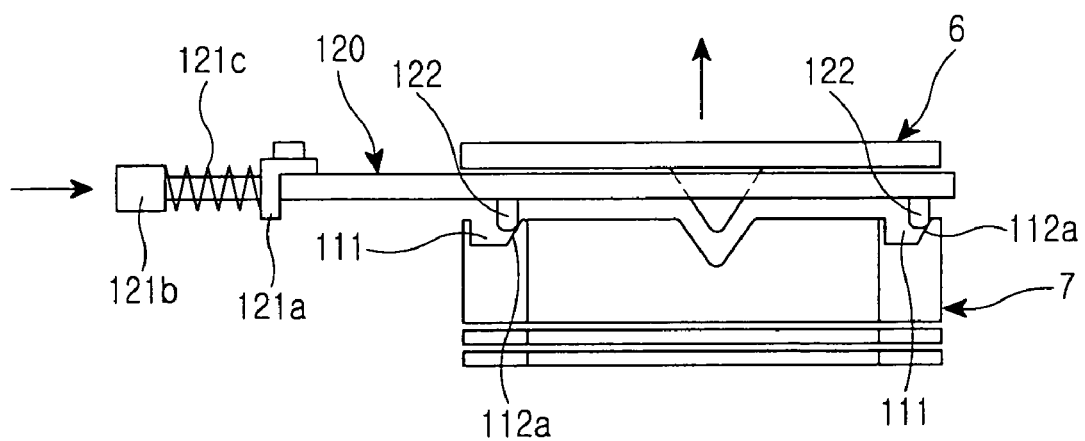
FIG. 13 is a side sectional view showing the hinge guide apparatus of the swing type portable terminal according to the preferred embodiment of the present invention, after operation thereof.

As shown in FIGS. 11 and 13, a inclined guide surface 112a is formed in each second engagement guide portion 112, so that the engagement member 122 of the hinge guide member 120 is guided, with the engagement member 122 inclined.

The first and second engagement guide portions 111 and 112 are formed along the circumference of the second hinge cam 7, and is recessed by a predetermined depth.

As shown in FIGS. 10 to 13, the hinge guide member 120 has an annular shape. A movement member 121 is provided on one side of the annular hinge guide member 120, which makes contact with the battery pack 3 and moves the hinge guide member 120 when the high capacity battery pack 3 is mounted to the body housing 2. At least one engagement member 122 is formed at the circumference of the annular hinge guide member 120, so as to be engaged with the first and second engagement guide portions 111 and 112.

Figure 14:
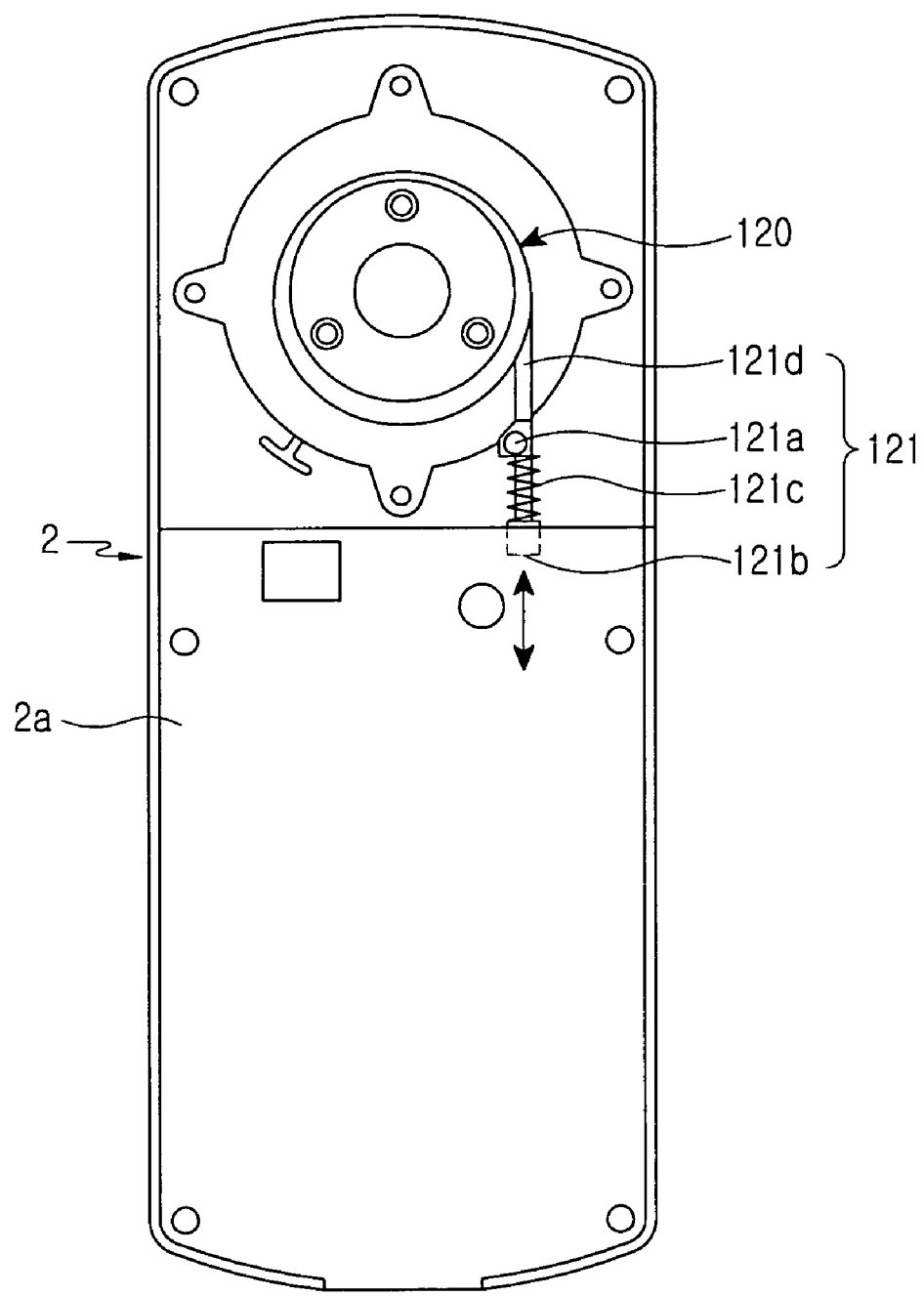
FIG. 14 is a plan view showing a state before a battery pack is mounted, with the hinge guide apparatus engaged with the swing-type portable terminal according to the preferred embodiment of the present invention.
Figure 15:
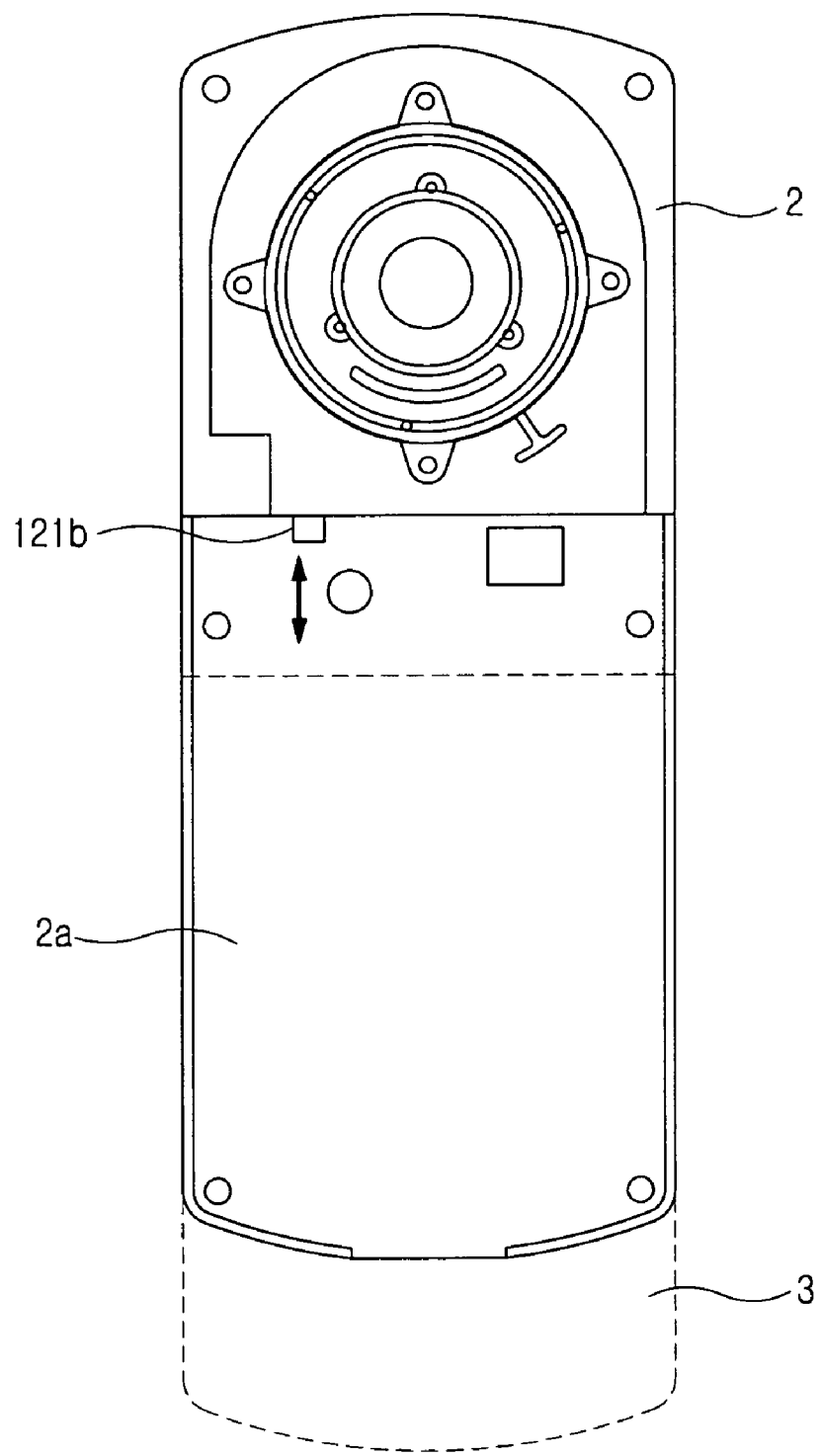
FIG. 15 is a plan view showing a process in which the battery pack is mounted, with the hinge guide apparatus engaged with the swing-type portable terminal according to the preferred embodiment of the present invention.

Further, as shown in FIGS. 14 and 15, a coupling portion 121a is formed at one end of the movement member 121 so as to be screw-coupled to a coupling boss 121d formed in the hinge guide member 120. A contact portion 121b is provided at the other end of the movement member 121 so as to make contact with the high capacity battery pack 3 mounted to the body housing 2. A resilient means 121c is provided between the coupling portion 121a and the contact portion 121b in order to absorb impact when the battery pack 3 makes contact with the contact portion 121b and to guide the hinge guide member 120. Preferably, the resilient member 121c is a coil spring.

As shown in FIG. 15, the contact portion 121b protrudes by a predetermined length in the battery pack mounting space 2a formed in the body housing 2.

In the case in which the standard capacity battery pack 3a is mounted into the battery pack mounting space 2a, an engagement recess (not shown) is formed in the standard capacity battery pack 3 so as to be engaged with the contact portion 121b.

The engagement member 122 includes a boss protruding by a predetermined length. As shown in FIGS. 11 and 13, one end of the boss has a rounded shape so as to be moved along the inclined guide surface 112a of the second engagement guide portion 112.

Hereinafter, the operation of the hinge guide apparatus of the swing-type portable terminal according to the present invention will be described in detail with reference to FIGS. 6 to 16.

As shown in FIGS. 6 and 7, the hinge guide apparatus 100 of the swing-type portable terminal includes at least one first engagement guide portion 111, at least one second engagement guide portion 112, and the hinge guide member 120.

The hinge guide member 120 is provided between the first and second hinge cams 6 and 7. Then, the engagement member 122 of the hinge guide member 120 is engaged with the first engagement guide portion 111 formed in the second hinge cam 7.

As shown in FIG. 15, the movement member 121 in the hinge guide member 120 protrudes into the battery pack mounting space 2a of the body housing 2 by a predetermined distance. Since the contact portion 121b making contact with the high capacity battery pack 3 is provided on the movement member 121, the contact portion 121b protrudes into the battery pack mounting space 2a.

In this state, as shown in FIGS. 8 and 9, the high capacity battery pack 3 is mounted into the battery pack mounting space 2a of the body housing 2. The battery pack 3 makes contact with the contact portion 121b protruding in the battery pack mounting space 2a, and moves the contact portion 121b in the mounting direction of the battery pack 3.

Figure 12:
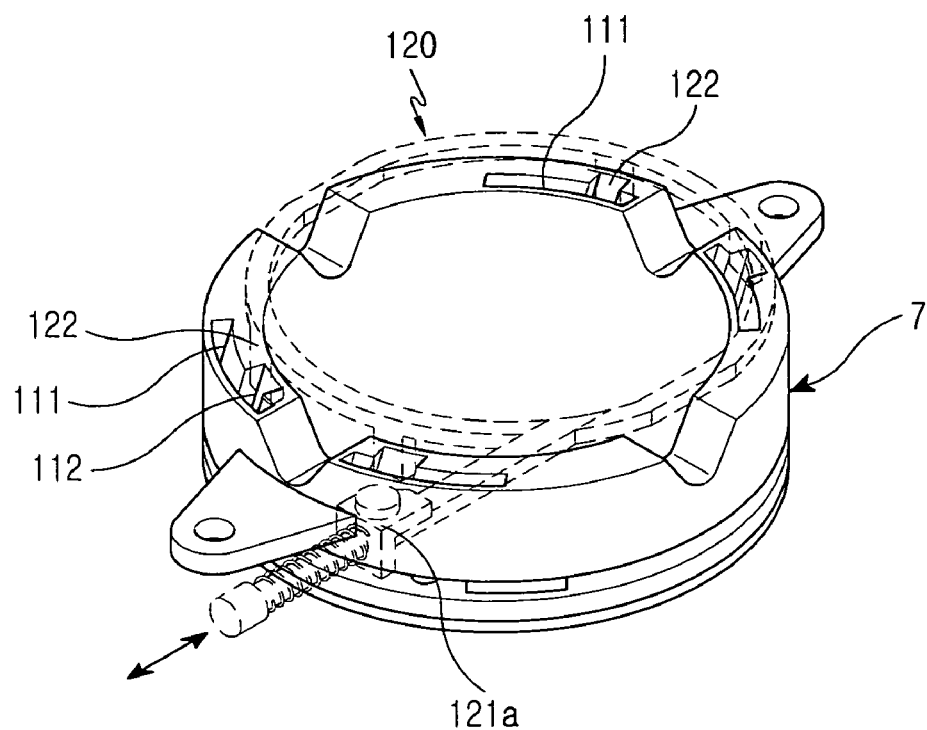
FIG. 12 is a perspective view showing the hinge guide apparatus of the swing type portable terminal according to the preferred embodiment of the present invention, after operation thereof.

Then, as shown in FIGS. 12 and 13, the contact portion 121b moves the coupling portion 121a of the movement member 121." Since the resilient means 121c is provided between the coupling portion 121a and the contact portion 121b, if the battery pack 3 makes contact with the contact portion 121b, the contact portion 121b transfers the impact to the resilient means 121c to absorb the impact and the coupling portion 121a of the movement member 121 is moved by the resilient force of the resilient means 121c. As shown in FIG. 13, as the movement member 121 is moved, the hinge guide member 120 is also moved together with the movement member 121.

Then, as shown in FIGS. 11 and 12, the engagement member 122 formed on the hinge guide member 120 is moved in the first engagement guide portion 111 of the second hinge cam 70, and is guided when the engagement member 122 is moved on the inclined guide surface 112a of the second engagement guide portion 112, while making contact with the inclined guide surface 112a.

As shown in FIG. 16, since the second engagement guide portion 112 has a recess of a predetermined depth and the inclined guide surface 112a, the engagement member 122 is moved along the inclined guide surface 112a of the second engagement guide portion 112 and is moved upward in the direction of the hinge axis A1. Then, the first hinge cam 6 is also moved upward, thereby widening the space between the first and second hinge cams 6 and 7, without inclination.

Figure 10:
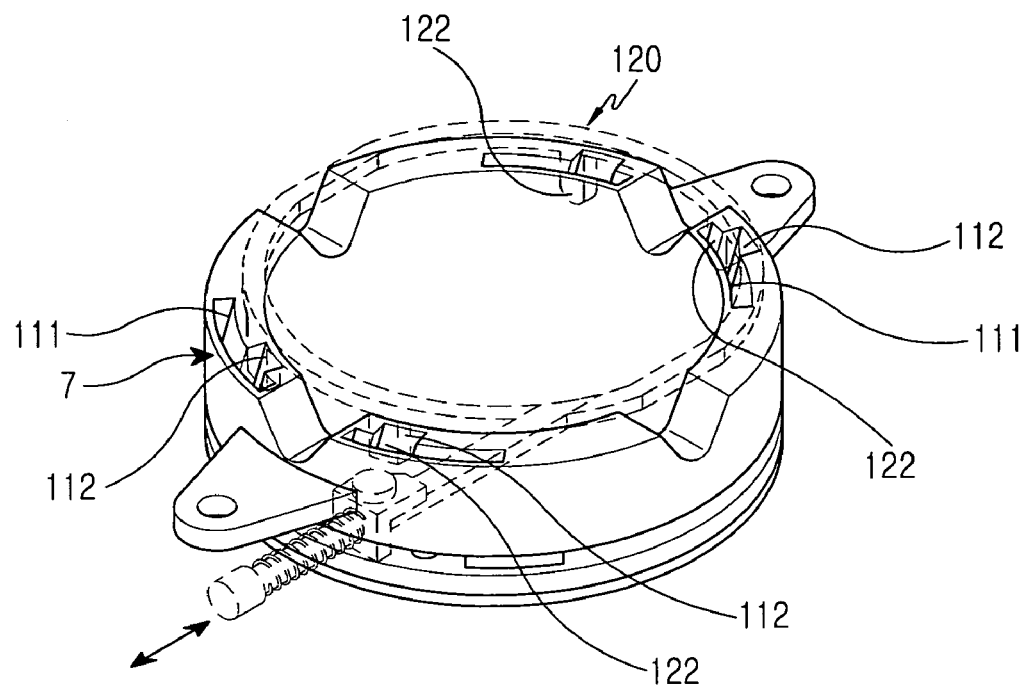
FIG. 10 is a perspective view showing the hinge guide apparatus of the swing type portable terminal according to the preferred embodiment of the present invention, before operation thereof.

Here, as shown in FIGS. 10 and 11, if the high capacity battery pack 3 is separated from the battery pack mounting space 2a of the body housing 2, the hinge guide member 120 is moved to the original position along the inclined guide surface 112a and the movement member 121 of the hinge guide member 120 also moved. Then, the contact portion 121b of the movement member 121 protrudes into the battery pack mounting space 2a. The engagement member 122 of the hinge guide member 120 is moved along the inclined guide surface 112a of the second engagement guide portion 112 to be engaged with the first engagement guide portion 111 again.

Then, if the standard capacity battery pack 3a is mounted into the battery pack mounting space 2a of the body housing 2, since the engagement recess (not shown) engaged with the contact portion 121b of the hinge guide member 120 is formed in the standard capacity battery pack 3a, the guided movement of the hinge guide member 120 can be prevented by engaging the contact portion 121b with the engagement recess.

According to the hinge module of the swing type portable terminal of the present invention, the hinge module is widened without inclination by guiding and moving the hinge guide member, thereby preventing the deformation of the hinge module, when attaching and detaching the high capacity battery pack having an increased thickness. Further, since the engagement recess engaged with the hinge guide member, for preventing the guide movement, is formed in the standard capacity battery pack, the standard capacity battery pack is easily attached and detached, thereby preventing the damage to the hinge module.

While the hinge guide apparatus of the swing-type portable terminal according to the present invention has been shown and described with reference to a certain preferred embodiment thereof, it will be understood by those skilled in the art that various changes in form and details may be made therein without departing from the spirit and scope of the invention as defined by the appended claims.

What is claimed is:

1. A hinge guide apparatus of a swing-type portable terminal having a body housing to and from which a battery pack is attached and detached, a swing housing rotating about a hinge axis vertically extending in a front surface of the body housing, and a hinge module having first and second hinge cams, a hinge shaft, and a swing plate to rotatably connecting the swing housing to the body housing, the hinge guide apparatus comprising:

at least one engagement guide formed in the second hinge cam; and a hinge guide member provided between the first and second hinge cams and movably engaged with the engagement guide, the hinge guide member widening the first and second hinge cams without inclination, by moving along the engagement guide in the mounting direction of the battery pack in an inclined manner when the battery pack is mounted to the body housing and moving the first hinge cam upward in a direction of the hinge axis.

2. A hinge guide apparatus according to claim 1, wherein the engagement guide comprises:

a first engagement guide portion formed along the circumference of the second hinge cam and engaged with an engagement member of the hinge guide member; and a second engagement guide portion formed at a location adjacent to the first engagement guide portion for guiding the movement of the hinge guide member, in which an inclined guide surface for moving the hinge guide member upward in the direction of the hinge axis in an inclined manner.

3. A hinge guide apparatus according to claim 2, wherein the first and second engagement guide portions are formed along the circumference of the second hinge cam, each of the first and second engagement guide portions having a recess.

4. A hinge guide apparatus according to claim 1, wherein the hinge guide member has an annular shape, and comprises a movement member making contact with the battery pack to move the hinge guide member when the battery pack is mounted to the body housing, the movement member being provided on one side of the annular hinge guide member, and at least one engagement member engaged with the first and second engagement guide portions formed at the circumference of the annular hinge guide member.

5. A hinge guide apparatus according to claim 4, wherein the engagement member has a boss protruding a predetermined distance, and one end of the boss has a rounded shape so as to be moved along the inclined guide surface of the second engagement guide portion.

6. A hinge guide apparatus according to claim 4, wherein a coupling portion screw-coupled to a coupling boss formed in the hinge guide member is formed at one end of the movement member, a contact portion making contact with the battery pack is provided at the other end of the movement member, and a resilient means for absorbing impact when the battery pack makes contact with the contact portion and providing a resilient force to move the hinge guide member is provided between the coupling portion and the contact portion.

7. A hinge guide apparatus according to claim 6, wherein the contact portion protrudes into a battery pack mounting space formed in the body housing by a predetermined length.

8. A hinge guide apparatus according to claim 1, wherein a high capacity battery is mounted into the battery mounting space, and an engagement recess engaged with the contact portion is formed in a standard capacity battery pack when the standard capacity battery pack is mounted.

* * * * *